United States Patent
Kwon

(10) Patent No.: US 7,471,960 B2
(45) Date of Patent: Dec. 30, 2008

(54) MESSAGE RECEIVING APPARATUS FOR MOBILE COMMUNICATION TERMINAL AND METHOD THEREOF

(75) Inventor: O In Kwon, Gwangmyeong (KR)

(73) Assignee: LG Electronics Inc., Seoul, S. (KR)

( * ) Notice: Subject to any disclaimer, the term of this patent is extended or adjusted under 35 U.S.C. 154(b) by 0 days.

(21) Appl. No.: 11/292,748

(22) Filed: Dec. 1, 2005

(65) Prior Publication Data

US 2006/0121948 A1 Jun. 8, 2006

(30) Foreign Application Priority Data

Dec. 3, 2004 (KR) ........................ 10-2004-0101168

(51) Int. Cl.
*H04Q 7/20* (2006.01)
(52) U.S. Cl. ........................ 455/466; 455/566; 455/557; 455/414.1
(58) Field of Classification Search ............. 455/414.1, 455/414.4, 466, 566, 412.1, 414.2, 414.3, 455/557
See application file for complete search history.

(56) References Cited

U.S. PATENT DOCUMENTS

| | | |
|---|---|---|
| 2002/0174186 A1 | 11/2002 | Hashimoto et al. |
| 2004/0160637 A1 | 8/2004 | Tuli |
| 2005/0066007 A1 * | 3/2005 | Wieczorek et al. ......... 709/206 |

FOREIGN PATENT DOCUMENTS

| | | |
|---|---|---|
| JP | 2002-278955 | 9/2002 |
| JP | 2004-206467 | 7/2004 |
| WO | WO 02/100121 A | 12/2002 |
| WO | WO 02/100121 A2 | 12/2002 |
| WO | WO 2004/105322 A | 12/2004 |

* cited by examiner

*Primary Examiner*—Temica M Beamer
(74) *Attorney, Agent, or Firm*—Lee Hong Degerman Kang & Waimey

(57) ABSTRACT

A message receiving apparatus for a mobile communication terminal and a method thereof. The method comprises receiving a message, displaying the received message, and when the received message can not be displayed, requesting an image file of the received message, and displaying the received image file. Accordingly, even if a received message includes a font that is not supported by the mobile communication terminal, the message is displayed as a text row or an image file and thus a user can precisely certify the received message.

18 Claims, 2 Drawing Sheets

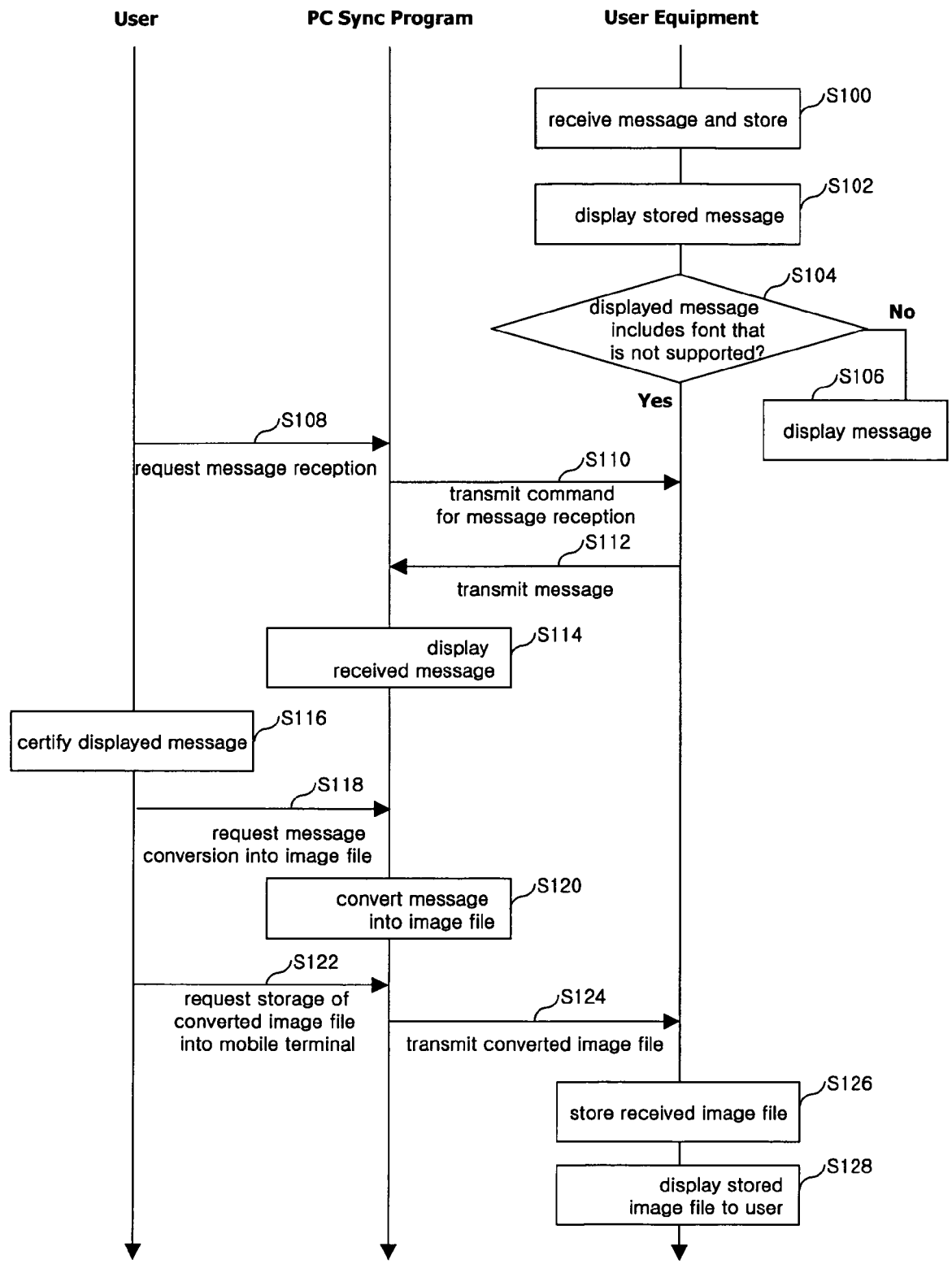

US 7,471,960 B2

MESSAGE RECEIVING APPARATUS FOR MOBILE COMMUNICATION TERMINAL AND METHOD THEREOF

CROSS REFERENCE TO RELATED APPLICATION

Pursuant to 35 U.S.C. § 119(a), this application claims the benefit of earlier filing date and right of priority to Korean Application No. 10-2004-0101168, filed Dec. 3, 2004, the contents of which are hereby incorporated by reference herein in their entirety.

BACKGROUND OF THE INVENTION

1. Field of the Invention

The present invention relates to a mobile communication terminal, and more particularly, to a message receiving apparatus for a mobile communication terminal capable of processing a received message, and a method thereof.

2. Description of the Background Art

A service provider of a mobile communication terminal provides functions such as a wireless internet access, a text and multimedia message transmission, a wireless on-line game, etc. to a user. Also, a manufacturing company of a mobile communication terminal provides functions such as a phone-book service, a memo and message writing service, a schedule management service, etc. to the user.

The text message service among the services is implemented by inputting text messages by a mobile communication terminal, by composing various texts, specific characters, codes, etc. by a personal computer, or by transmitting the existing text messages by edition. In an internet portal site, various text messages and codes are freely provided, so that a user can transmit a text message including various character sets besides the existing text message and code.

At the time of receiving not only a text message transmitted from a mobile communication terminal but also a text message transmitted from a personal computer, if the received text message includes a character set corresponding to a font that is not supported by the mobile communication terminal, the mobile communication terminal blank-processes the received message. Then, the mobile communication terminal temporarily stores the text message in order to later certify it. However, it was impossible to certify the stored text message.

BRIEF DESCRIPTION OF THE INVENTION

Therefore, an object of the present invention is to provide a mobile communication terminal capable of displaying a received message including a font that is not supported by the mobile communication terminal by displaying the font as a text row corresponding to a uni-code by a PC synchronization program and then by converting the text row into an image file.

To achieve these and other advantages and in accordance with the purpose of the present invention, as embodied and broadly described herein, there is provided a mobile communication terminal, comprising: a memory for storing a received message; a display unit for displaying the stored message; and a controller for requesting an image file of a received message that can not be displayed from a computer, storing the image file, and then displaying the image file on the display unit.

To achieve these and other advantages and in accordance with the purpose of the present invention, as embodied and broadly described herein, there is also provided a message receiving method for a mobile communication terminal, comprising: receiving a message; displaying the received message; and when the received message can not be displayed, requesting a transmission of an image file of the received message; and displaying the received image file.

Preferably, the mobile communication terminal transmits the converted image file to another user's terminal by using a multimedia messaging service (MMS) or an E-mail.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flowchart showing a message receiving method for a mobile communication terminal according to the present invention.

DETAILED DESCRIPTION OF THE INVENTION

Figure 1:
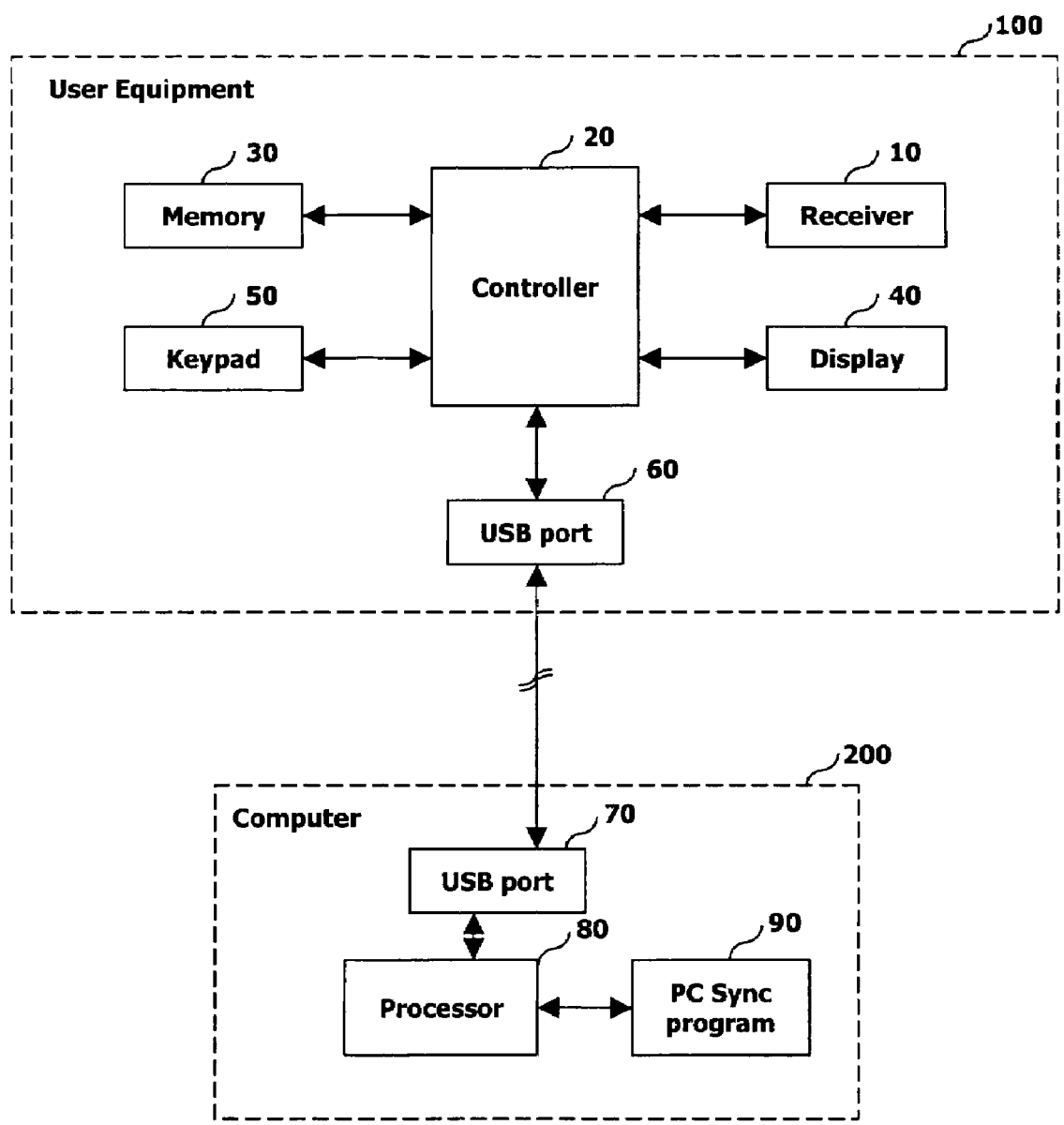
FIG. 1 is a construction view showing a message receiving apparatus for a mobile communication terminal according to the present invention.

Reference will now be made in detail to the preferred embodiments of the present invention, examples of which are illustrated in the accompanying drawings.

Hereinafter, a preferred embodiment of the present invention will be explained with reference to the attached drawings.

The present invention is to provide a mobile communication terminal capable of displaying a received message including a font that is not supported by the mobile communication terminal to a user by displaying the font as a text row corresponding to a uni-code by a PC synchronization program and then by converting the text row into an image file, and a method thereof.

FIG. 1 is a block diagram showing a message receiving apparatus for a mobile communication terminal according to the present invention.

As shown, the message receiving apparatus for a mobile communication terminal according to the present invention comprises a mobile communication terminal 100 and a computer 200.

The mobile communication terminal 100 comprises a receiving unit 10 for receiving data such as voice data, audio data, and a message inputted through an antenna (not shown), a controller 20 for storing a message inputted through the receiving unit 10 and controlling an output of the stored message according to a command requested by a PC synchronization program, a keypad 50 including a plurality of function keys for receiving a command from a user, scroll keys, numeric keys, and character keys, a memory 30 for storing a message inputted through the receiving unit 10 and a universal serial bus (USB) port, a displaying unit 40 for displaying each kind of menu, a character set, and an image file on a screen based on a control signal of the controlling unit 20, and a USB port 60 for connecting the mobile communication terminal 100 to the PC 200 through a USB cable.

The computer (e.g. a personal computer) comprises a USB port 70 connected to the mobile communication terminal 100 through a USB cable, a PC synchronization program 90 for converting a message received through the USB port into an image file, and a processor 80 for controlling the entire computer including the PC synchronization program.

Hereinafter, an operation of the message receiving apparatus for a mobile communication terminal according to the present invention will be explained.

When a message such as an SMS and an MMS is received through the receiving unit 10, the controlling unit 20 stores the received message in the memory 30 and displays an alarm message indicating that the message has been received on the display unit 40. When a user inputs a command through the key pad 50 in order to certify the received message, the controlling unit 20 transmits the received message stored in the memory 30 to the displaying unit 40. Then, the displaying unit 40 displays the received message. If the received message includes a character set corresponding to a font that is not supported by the mobile communication terminal (e.g. a code, a text message, etc.), the controlling unit 20 processes the received message as a blank and then displays the received message on the displaying unit 40.

To certify a contents of the received message represented as a blank on the displaying unit 40, the user connects the USB port 60 of the mobile communication terminal 100 to the USB port 70 of the computer 200 through a USB cable. The user transmits a command for a message reception request to the mobile communication terminal 100 through the PC synchronization program installed in the computer 200.

The mobile communication terminal 100 that has received the command for a message reception request transmits the message to the computer 200 through the USB port 60 by using a PC synchronization function provided at the mobile communication terminal. The message is received through the USB port 70 of the PC, and then the received message is stored in a storing unit (not shown) by the processor 80. The stored message is displayed as a text row corresponding to a uni-code of a corresponding font by the PC synchronization program 90. If the user requests a conversion of the message into an image file in order to certify the contents, the PC synchronization program converts the message into an image file.

Also, if the user requests a transmission of the converted image file to the mobile communication terminal, the PC synchronization program transmits the image file to the mobile communication terminal 100 through the USB port 70 in the same manner as the message reception method. Then, the mobile communication terminal stores the received image file in the memory 30, and the stored image file is displayed on the displaying unit 40. As the result, the user can certify the received message including a font that is not supported by the mobile communication terminal.

FIG. 2 is a flowchart showing a message receiving method for a mobile communication terminal according to the present invention.

A message receiving method for a mobile communication terminal according to the present invention will be explained with reference to FIG. 2.

When the mobile communication terminal receives a message such as an SMS and an MMS including various character sets composed by a computer or an internet portal site, the mobile communication terminal stores the received message in the memory (S100). If the user inputs a command to the mobile communication terminal in order to certify the stored message, the mobile communication terminal displays the stored message on the displaying unit (S102). If the stored message includes a font that is supported by the mobile communication terminal, the mobile communication terminal displays the message on the displaying unit (S104). On the contrary, if the stored message includes a font that is not supported by the mobile communication terminal, the mobile communication terminal processes the message as a blank and then displays the message on the displaying unit (S106).

After certifying the message processed as a blank on the displaying unit, the user connects the mobile communication terminal to the PC through the USB cable and operates the PC synchronization program of the PC (S108). Then, the user transmits a reception request command for the message to the mobile communication terminal by the operated program (S110). The mobile communication terminal that has received the command for a message reception request transmits the stored message to the PC through the USB port 60 by the PC synchronization function (S112). The PC that has received the message displays the font corresponding to the message processed as a blank into a text row corresponding to a uni-code (S114) by using the PC synchronization program operated by the user. Then, the user certifies the text processed as a blank from the transmitted message (S116). If a font of the message processed as a blank is not found even in the PC synchronization program, a font update message is pop-up on a monitor so as to allow the user to update the corresponding font.

If the user having certified the message is to transmit the message to another user's mobile communication terminal by using his terminal or an E-mail, the user requests a conversion of the message processed as a blank into an image file by the PC synchronization program (S118). Then, the user requests the converted image file to be stored in the mobile communication terminal from the program, and the program transmits the converted image file to the mobile communication terminal through the USB port 70 (S124).

The mobile communication terminal stores the message transmitted as an image file (S126), and displays the stored image file on the displaying unit (S128). The mobile communication terminal can transmit the image file to another user's terminal by using an MMS or an E-mail.

As aforementioned, in the present invention, when a received message includes a character set corresponding to a font that is not supported by the mobile communication terminal, the message is converted into an image file through the PC synchronization program. Therefore, a received message including a character set corresponding to a font that is not supported by the mobile communication terminal can be efficiently certified.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
  a memory for storing a received message;
  a display unit for displaying the received message stored in the memory; and
  a controller for checking whether the received message comprises a text message that cannot be displayed, requesting an image file of the text message that cannot be displayed from a computer, storing the image file, and displaying the image file on the display unit.

2. The terminal of claim 1, wherein the controller transmits the text message that cannot be displayed to the computer.

3. The terminal of claim 1, wherein the controller stores the image file received from the computer in the memory.

4. The terminal of claim 1, wherein the image file is a file converted from the message that cannot be displayed on the display unit.

5. The terminal of claim 1, wherein the image file is transmitted to another user's mobile communication terminal by using a multimedia messaging service or an E-mail.

6. The terminal of claim 1, wherein the computer comprises a program for converting the message that cannot be displayed into an image file.

7. A message receiving method for a mobile communication terminal, comprising:
    receiving a message;
    displaying the received message if the received message can be displayed;
    utilizing a controller for checking whether the received message comprises a text message that cannot be displayed if the received message cannot be displayed;
    requesting an image file of the text message that cannot be displayed; and
    displaying the received image file.

8. The method of claim 7, further comprising transmitting the received message that cannot be displayed on a display unit to a computer, and receiving a converted image file by using the computer.

9. The method of claim 7, wherein the step of displaying comprises storing the image file in a memory and displaying the image file on a display unit.

10. The method of claim 7, wherein the received image file is a file converted from the message that cannot be displayed on the display unit.

11. The method of claim 7, wherein the image file is transmitted to another user's mobile communication terminal by using a multimedia messaging service or an E-mail.

12. The method of claim 8, wherein the computer comprises a program for converting the message that cannot be displayed into an image file therein.

13. A message receiving method for a mobile communication terminal, comprising:
    receiving a message;
    transmitting the message to a computer device when the message has a portion that cannot be displayed;
    receiving a file including the message converted to an image from the computer device; and
    displaying the received file.

14. A mobile communication terminal, comprising:
    a display unit for displaying a first message or file; and
    a controller for transmitting a second message to a computer device if the first message or file has a portion that cannot be displayed and displaying a second file on the display unit when the second file including the first message or file converted to an image is received from the computer device.

15. The terminal of claim 1, wherein the text message comprises a character set corresponding to a font that is not supported by the terminal.

16. The method of claim 7, wherein the text message comprises a character set corresponding to a font that is not supported by the terminal.

17. The method of claim 13, wherein the received message comprises a character set corresponding to a font that is not supported by the terminal.

18. The terminal of claim 14, wherein the first message comprises a character set corresponding to a font that is not supported by the terminal.

\* \* \* \* \*